(12) United States Patent
Iqbal et al.

(10) Patent No.: US 11,552,930 B2
(45) Date of Patent: Jan. 10, 2023

(54) VIRTUAL DOMAINS WITHIN A SHARED DEVICE

(71) Applicant: Equinix, Inc., Redwood City, CA (US)

(72) Inventors: Syed Hashim Iqbal, San Jose, CA (US); Muhammad Durrani, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 194 days.

(21) Appl. No.: 17/008,027

(22) Filed: Aug. 31, 2020

(65) Prior Publication Data
US 2022/0070147 A1  Mar. 3, 2022

(51) Int. Cl.
| | |
|---|---|
| *H04L 12/46* | (2006.01) |
| *G06F 21/71* | (2013.01) |
| *H04L 12/66* | (2006.01) |
| *H04L 9/40* | (2022.01) |

(52) U.S. Cl.
CPC ...... *H04L 63/0272* (2013.01); *H04L 12/4633* (2013.01); *H04L 12/66* (2013.01); *H04L 63/0236* (2013.01); *H04L 63/0263* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 6,085,238 | A  * | 7/2000 | Yuasa | H04L 12/4641 370/409 |
| 7,209,959 | B1 * | 4/2007 | Campbell | H04L 63/0421 709/227 |
| 7,864,770 | B1 * | 1/2011 | Baker | H04L 12/4641 370/395.31 |
| 9,294,443 | B2 | 3/2016 | Johnson et al. | |
| 9,886,267 | B2 | 2/2018 | Maheshwari et al. | |

(Continued)

OTHER PUBLICATIONS

SuVMF: Software-defined Unified Virtual Monitoring Function for SDN-based Large-scale Networks. Choi. ACM. (Year: 2014).*

(Continued)

*Primary Examiner* — Venkat Perungavoor
(74) *Attorney, Agent, or Firm* — Shumaker & Sieffert, P.A.

(57) ABSTRACT

In general, this disclosure describes techniques for using virtual domains. In one example, a method comprises receiving, by a computing device, configuration data defining: an external virtual domain for a network function, the external virtual domain connected to a public network and managed by a provider for the computing device; a virtual domain for the network function, the virtual domain separate from the external virtual domain, configured with a secure tunnel interface, connected to a customer network, and managed by a customer of the provider for the computing device; forwarding, by the external virtual domain implementing a route-based virtual private network, encrypted network traffic, received from the public network via a secure tunnel, to the secure tunnel interface configured in the virtual domain; decrypting, by the virtual domain, the encrypted network traffic to generate network traffic; and forwarding, by the virtual domain, the network traffic to the customer network.

19 Claims, 6 Drawing Sheets

(56) References Cited

U.S. PATENT DOCUMENTS

| | | | |
|---|---|---|---|
| 9,948,552 | B2 | 4/2018 | Teng et al. |
| 9,973,489 | B2 | 5/2018 | Barton et al. |
| 10,129,078 | B2 | 11/2018 | Kumar et al. |
| 2005/0055463 | A1* | 3/2005 | Saunders ............ H04L 63/0209 726/36 |
| 2011/0019674 | A1* | 1/2011 | Iovanna ................. H04L 45/02 370/392 |
| 2013/0091501 | A1* | 4/2013 | Barabash ............ H04L 41/5096 718/1 |
| 2016/0308762 | A1 | 10/2016 | Teng et al. |
| 2019/0104109 | A1 | 4/2019 | Cidon et al. |
| 2019/0342346 | A1 | 11/2019 | Jain et al. |
| 2020/0195607 | A1 | 6/2020 | Wang et al. |
| 2020/0304476 | A1* | 9/2020 | Moore ................ H04L 63/0281 |

OTHER PUBLICATIONS

SVDR: A scalable virtual domain-based routing scheme for CCN. Li. El Sevier. (Year: 2018).*

VDR: A scalable virtual domain-based routing scheme for CCN. Rehman. IEEE. (Year: 2017).*

A Comparative Analysis of Unicast Routing Protocols for MPLS-VPN. Farhan. Singh. LGURJCSIT. (Year: 2019).*

Fang et al., "BGP/MPLS IP VPN Data Center Interconnect, draft-fang-l3vpn-data-center-interconnect-03," Cisco Internet-Draft, Jul. 4, 2014, 13 pp.

Morad, "Connecting a Single Customer Router to Multiple VPCs," AWS, Retrieved Nov. 27, 2020 from: https://aws.amazon.com/articles/connecting-a-single-customer-router-to-multiple-vpcs/#_Toc331767311, Oct. 11, 2012, 12 pp.

"AWS Site-to-Site VPN," Amazon Web Services, User Guide, Retrieved Dec. 23, 2020 from: https://web.archive.org/web/20200628140732/https://docs.aws.amazon.com/vpn/latest/s2svpn/s2s-vpn-user-guide.pdf, Accessed date: Jun. 28, 2020, 143 pp.

"How Can I Configure a Tunnel Interface VPN (Route-Based VPN) Between Two SonicWalls?," Sonicwall, Retrieved Dec. 23, 2020 from: https://web.archive.org/web/20200923125758/https://www.sonicwall.com/support/knowledge-base/how-can-i-configure-a-tunnel-interface-vpn-route-based-vpn-between-two-sonicwalls/170505880843761/, Mar. 26, 2020, 17 pp.

U.S. Appl. No. 16/836,777, filed Mar. 31, 2020, naming inventors Iqbal et al.

International Search Report and Written Opinion of International Application No. PCT/US2021/071162, dated Dec. 7, 2021, 14 pp.

* cited by examiner

VIRTUAL DOMAINS WITHIN A SHARED DEVICE

TECHNICAL FIELD

The disclosure relates to data centers and, more specifically, to using virtual domains within a shared device that applies a network function.

BACKGROUND

A data center provider may employ a facility, such as a data center or warehouse, in which multiple customers of the provider offer connections and/or locate network, server, and storage gear and interconnect to a variety of telecommunications, cloud, and other network service provider(s) with a minimum of cost and complexity. Such data centers may be shared by the multiple customers. By interconnecting at such facilities, the customers of the provider including telecommunications providers, Internet Service Providers (ISPs), application service providers, service providers, content providers, and other providers, as well as enterprises, enjoy less latency and the freedom to focus on their core business.

A network operator, such as the data center provider, may provide network functions that can be applied to packets traversing a switching fabric of the data center that is managed by the data center provider. The network functions may be implemented using specialized hardware appliances, such as firewalls or routers and sometimes referred to as Physical Network Functions (PNFs), or implemented using a Network Functions Virtualization (NFV) architecture or infrastructure (NFVI) that may include Virtualized Network Functions (VNFs). A network function (PNF or VNF) may provide firewall, routing, carrier grade network address translation (CG-NAT), performance enhancement proxies for video, transport control protocol (TCP) optimization and header enrichment, caching, load balancing, or other network functions, for example. A VNF may be executed by one or more virtual machines, containers, or other execution environment of the NFV Infrastructure. In this way, virtualized network functions may be executed by servers, switches, storage devices, and cloud computing infrastructure.

SUMMARY

In general, this disclosure describes techniques for using virtual domains within a device shared among multiple customers of a data center provider to provide secure virtual private networking, inter-customer network forwarding, and application of network functions. A device that offers network functions, such as PNFs and VNFs, may provide for domain isolation of customer networks coupled to the device. Customer networks may be associated with customers of the data center provider, which may include enterprises, network service providers, cloud service providers, and other customers. Customer equipment associated with customer networks may be co-located within a data center of the data center provider and connected to the data center switching fabric or may be connected to the data center via a network service provider or other connection to the data center switching fabric.

In some examples, the data center provider may deploy the device and configure the device with multiple virtual domains for respective customers and an external virtual domain that operates as a gateway for the virtual domains to reach external networks, such as networks of internet service providers or cloud service providers that are not linked to one of the virtual domains of the device. A co-located customer network in the data center may reach branch offices for the customer via the external virtual domain. In addition, the data center provider may configure the device with preconfigured connections between pairs of virtual domains to enable routing of packets among virtual domains between customer networks linked to the virtual domains. Such preconfigured connections may include a connection between a virtual domain for a customer and the external virtual domain to enable the customer network for the customer to reach external networks.

In some examples, the device integrates secure virtual private networking (VPN) functionality by performing route-based VPN techniques and terminating secure VPN tunnels within the virtual domains. Contrary to deployments in which a secure VPN gateway terminates secure VPN tunnels (e.g., decrypts encrypted traffic among other operations) and forwards the decrypted traffic to the destination network, the external virtual domain configured in the device applies a route-based VPN to the encrypted traffic received at the external virtual domain to direct the encrypted traffic to a virtual domain of the device that is linked to the destination network for the encrypted traffic. This virtual domain is configured with a secure tunnel interface and decrypts the traffic before forwarding the traffic to the destination network. In effect, the device enables secure VPN across multiple virtual domains having secure VPN tunnel endpoints.

The aspects described above, and further aspects described herein may provide one or more technical advantages that present at least one practical application. For example, isolating the virtual domains for customers and terminating secure VPN tunnels within the customer-specific virtual domains may improve security of customer traffic because unencrypted traffic for multiple customers does not traverse common links. Moreover, this technical advantage accrues with only a single device shared by the multiple customers. As another example, the techniques may facilitate multi-tenancy on a single device while promoting secure traffic handling, as described above. As a result, the data center provider may deploy a single device (or lease a single device to a reseller) that can be securely shared among multiple different customers of the data center provider, thereby increasing utilization of the device and at least in some cases leading to efficiencies.

In one example, a computing device comprises processing circuitry coupled to a memory, the processing circuitry and memory configured to implement: a network function; an external virtual domain for the network function, the external virtual domain connected to a public network and managed by a provider for the computing device; and a virtual domain for the network function, the virtual domain separate from the external virtual domain, configured with a secure tunnel interface, connected to a customer network, and managed by a customer of the provider for the computing device, wherein the external virtual domain implements a route-based virtual private network to forward encrypted network traffic, received from the public network via a secure tunnel, to the secure tunnel interface configured in the virtual domain, and wherein the virtual domain is configured to decrypt the encrypted network traffic to generate network traffic and forward the network traffic to the customer network.

In one example, a computing device comprises processing circuitry coupled to a memory, the processing circuitry and memory configured to implement: a network function; a first virtual domain for the network function, the first virtual domain connected to a first customer network, and managed by a first customer of a provider for the computing device; a second virtual domain for the network function, the second virtual domain separate from the first virtual domain, connected to a second customer network, and managed by a second customer of a provider for the computing device; and a virtual domain connection enabling network traffic forwarding from the first virtual domain to the second virtual domain, the virtual domain connection configured by the provider for the computing device.

In one example, a method comprises receiving, by a computing device, configuration data defining: an external virtual domain for a network function, the external virtual domain connected to a public network and managed by a provider for the computing device; a virtual domain for the network function, the virtual domain separate from the external virtual domain, configured with a secure tunnel interface, connected to a customer network, and managed by a customer of the provider for the computing device; forwarding, by the external virtual domain implementing a route-based virtual private network, encrypted network traffic, received from the public network via a secure tunnel, to the secure tunnel interface configured in the virtual domain; decrypting, by the virtual domain, the encrypted network traffic to generate network traffic; and forwarding, by the virtual domain, the network traffic to the customer network.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
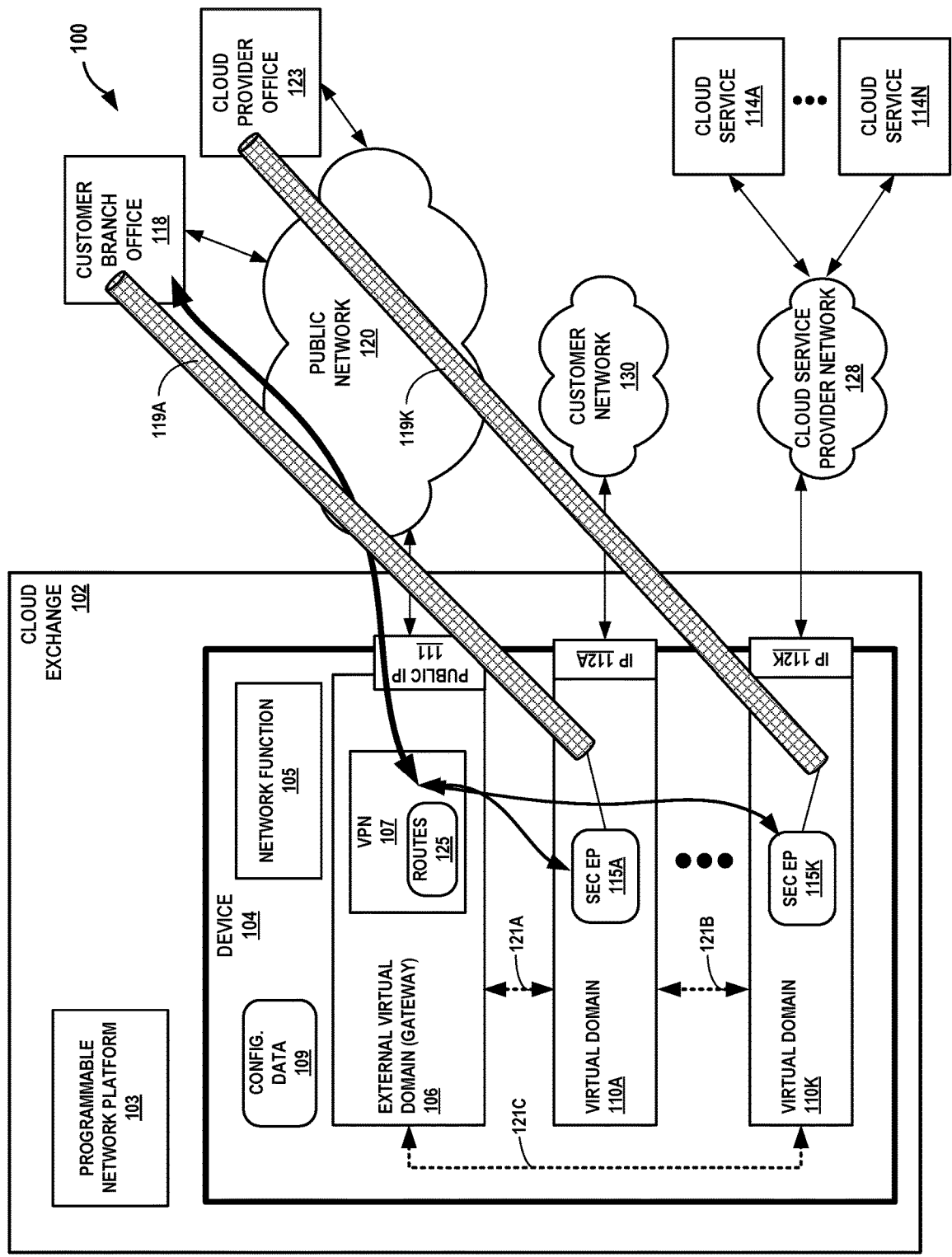
FIG. 1 is a block diagram that illustrates a system including an example device configured and operating according to techniques described herein.

FIG. 1 is a block diagram that illustrates a system 100 including an example device 104 configured and operating according to techniques described herein. In the example of FIG. 1, system 100 includes a cloud exchange 102 that includes a data center switching fabric connected to device 104. The data center switching fabric, device 104, and other devices of cloud exchange 102 (not shown) may be configured by programmable network platform 103.

In some instances, cloud exchange 102 may represent an Equinix Cloud Exchange Fabric provided by Equinix, Inc. of Redwood City, Calif. Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

System 100 also includes a public network 120 connected to a customer branch office 118, a customer network 130, and a cloud service provider network 128 that provides one or more cloud services 114A-114N (collectively, "cloud services 114"). Public network 120 may be a network that is publicly available with few or no restrictions. For example, public network 120 may be a network that is part of or otherwise connected to the Internet, a network service provider network, an autonomous system, an Internet service provider network, or a combination or one or more of such networks.

Customer network 130 is a network deployed and/or managed by a customer of a provider that deploys and/or manages cloud exchange 102. Cloud exchange 102 may be implemented at least in part using a data center switching fabric located within one or more data centers (not shown) in which a customer also co-locates networking, computing, and other equipment for customer network 130. This data center switching fabric may be alternatively referred to as a data center fabric, exchange fabric, cloud exchange fabric, switching network, data center network, or other network that operates as data center infrastructure and can be deployed and configured to interconnect multiple customers networks of the data center provider having access to ports within the data center switching fabric. The customer for customer network 130 may be an enterprise, a reseller, a managed service provider, a network service provider, an internet service provider, a cloud service provider, or other entity. Customer branch office 118 may be a remote branch office of the customer for customer network 130, connected to public network 120.

Cloud service provider network 128 is a network deployed and/or managed by a cloud service provider that is a customer of the provider that deploys and/or manages cloud exchange 102. Cloud service provider network 128 may represent a public, private cloud, hybrid cloud, a virtual private cloud within a public cloud, or other network that offers cloud services. Cloud services 114 source and sink cloud service traffic exchanged with other networks, such as customer network 130. Cloud provider office 123 may be a remote branch office of the cloud provider entity for cloud service provider network 128, connected to public network 120.

Device 104 may be a network appliance, router, firewall, switch, or other physical network device that provides a network function 105. Device 104 may be a Physical Network Function (PNF) as defined by the European Telecommunications Standards Institute (ETSI). Device 104 may provide forwarding and network address translation services for network traffic to and from the VNF 204.

In accordance with techniques described in this disclosure, device 104 stores configuration data 109 that defines a configuration of device 104. Programmable network platform 103 or an operator may invoke an interface of device 104 to add, delete, or modify configuration data 109. Configuration data 109 defines external virtual domain 106 and multiple virtual domains 110A-110K (collectively, "virtual domains 110"). Each of external virtual domain 106 and virtual domains 110 is a virtual instance of device 104 that is connected to at least one network via a different port of device 104 (not shown) and that is isolated from the other virtual domains unless configuration data 109 defines a virtual connection between the virtual domain and one or more other virtual domains.

A provider may deploy a device 104 that can be shared among multiple different customers of the provider, e.g., a data center provider. The provider configures device 104 with configuration data 109 to define virtual domains 110 for respective customers of the provider or other entity, such as a reseller. As such, each customer has a separate, isolated virtual domain that forwards traffic associated with a network for the customer and received at the virtual domain. For example, virtual domain 110A is associated with a first port of device 104 connected to customer network 130 and forwards traffic associated customer network 130, virtual domain 110K is associated with a second port of device 104 connected to cloud service provider network 128 and forwards traffic associated with a cloud service provider for cloud service provider network 128.

Device 104 may apply network function 105 to any network traffic traversing a domain, according to policies configured by the customer associated with the domain. For example, a customer for customer network 130 may configure virtual domain 110A with particular routing policies, firewall rules, NAT rules, or other network function rules, policies, or configuration, in order to realize the customer's network function preferences with respect to network traffic traversing virtual domain 110A of device 104. Configuration data 109 may limit customers to only configuring their respective domains 110 and prevent customers from configuring or modifying, e.g., the existence of virtual domains 106, 110; virtual domain connections between any of 106, 110; or connections of virtual domains 106, 110 to networks. The device 104 may limit configuration of virtual domains to authorized parties, e.g., resellers or customers, using Terminal Access Controller Access-Control System (TACACS), TACACS+, or Remote Authentication Dial-In User Service (RADIUS), or Diameter, for virtual domain authorization, for instance. In some examples, only the provider of the network function 105 for device 104 may be authorized to configure external virtual domain 106 and virtual domain connections 121. Additional details for limiting authorization are found in U.S. patent application Ser. No. 16/836,77, filed Mar. 31, 2020, entitled "Virtual Network Function Virtual Domain Isolation," which is incorporated by reference herein in its entirety.

In some examples, virtual domains may include a virtual routing and forwarding (VRF) instance having an interface to the corresponding network. For example, external virtual domain 106 has an interface having a public IP address 111 on the public network 120. Virtual domain 110A has an interface with IP address 112A on customer network 130. Virtual domain 110K has an interface with an IP address on cloud service provider network 128. In some examples, the VRFs of the virtual domains 106, 110 are configured with routing information to facilitate inter-VRF forwarding (e.g., route leaking) of traffic based on properties of the traffic. The provider for device 104 may preconfigure, by setting configuration data 109, these virtual domain connections to "stitch" two virtual domains 110 together by configuring import and export route targets in the corresponding VRFs to enable route leaking between the virtual domains. Optional virtual domain connections 121A-121C (collectively, "virtual domain connections 121") between virtual domains 110 are illustrated in FIG. 1. In some examples, the customers are prevented by a configuration of device 104 to configure or otherwise modify virtual domain connections 121A-121C. The virtual domain connections 121 are configured by the provider for device 104, in some cases based on subscriptions by a customer to cloud services and/or data center services or requests for connectivity to other customers. In some cases, the virtual domain connections 121 are preconfigured before the customers have access to modify the respective configurations for their respective virtual domains. For customer network 130 to access the Internet and/or customer branch office 118, and vice-versa, the virtual domain 110 may in some cases have virtual domain connection 121 with external virtual domain 106, which operates as a VPN gateway for device 104. IP addresses 112A-112K for respective virtual domains 110A-110K may be private or public.

In some examples, virtual domains may represent firewall domains. For example, external virtual domain 106 may be a firewall domains that applies network function 105 (a firewall, in such examples) to network traffic received from public network 120 or from any of virtual domains 110. The firewall domains may implement firewall rules to determine whether and how network traffic received passes through external virtual domain 106 or other virtual domains 110. The other virtual domains 110 may also be configured to implement firewall preferences for the respective customers for the virtual domains 110.

Device 104 may avoid labeled VPN traffic because the network traffic is inside the device 104 traversing virtual domains 106, 110. For example, virtual domain 110A may be a virtual firewall domain or a VRF instance. The reseller or customer/tenant have the ability to configure virtual domain 110A with configuration (e.g. command-line interface) restrictions to virtual domain 110A. Device 104 has configuration data indicating ports for the customer belong to virtual domain 110A and, upon receiving traffic from the customer network coupled to such ports, device 104 executing virtual domain 110A applies the routing table or firewall rules for the domain and then forwards as normal.

Each of IP addresses 112 for respective virtual domains 110 may be a public IP for a site-to-site secure tunnel 119, or virtual domains can share a public IP 111 using virtual domain connections 121. Secure tunnel endpoints resolve to particular virtual domains 110. If virtual domains share a public IP 111, VPN 107 demultiplexes based on the destination public IP, source IP for the external site, or a combination thereof.

Virtual domains 110 may advertise routes using BGP over secure tunnels 119. Customer branch office 118 or other site may advertise its gateway router. Cloud service provider network 128 may advertise its gateway router. External virtual domain 106 may perform forwarding for routes received from external gateway routers. Received routes may be stored in routes 125 for route-based virtual private networking. Received routes may also be stored in one or more virtual domains 110 for forwarding based on such routes (or firewall rules). These routes may be used for inter-virtual domain forwarding via virtual domain connections 121.

Accordingly, virtual domain 110K may forward cloud service traffic from cloud service 114A received via cloud service provider network 128 to external virtual domain 106 via virtual domain connection 121C and vice-versa. In some examples, cloud service traffic received at virtual domain 110K may be processed using the network function 105 prior to forwarding to external virtual domain 106 for forwarding to a destination. External virtual domain 106 may also apply network function 105, according to policies for the network function 105 for external virtual domain 106. A similar process may be applied in the reverse direction from a cloud server 114 to cloud client 118.

Device 104 implements a route-based virtual private network (VPN) 107 using routes 125 to determine whether to route network traffic into one of secure tunnels 119A-119K (collectively, "secure tunnels 119") and to determine into which virtual domain 110 to route network traffic received from any of secure tunnels 119. The provider of device 104 sets configuration data 109 to create secure endpoints 115A-115K (collectively, "secure endpoints 115") that are secure virtual tunnel interfaces for device 104. Secure tunnels 119 may represent IPSec tunnels or other encrypted tunnels that may be used to implement VPN 107.

Secure endpoints 115 send and receive encrypted, tunneled network traffic within the respective virtual domains 110 to facilitate traffic isolation among the various customers for respective virtual domains 110. When external virtual domain 106 receives encrypted network traffic via one of secure tunnels 119, external virtual domain 106 applies routes 125 to route the encrypted network traffic, based on the source IP/port and/or destination IP/port information of the encrypted network traffic, into the correct one of virtual domains 110. For example, the device 104 provider may configure a route of routes 125 to cause external virtual domain 106 forward traffic that is sourced by customer branch office 118, destined to customer network 130, or both sourced by customer branch office 118 and destined to customer network 130, to the secure endpoint 115A in virtual domain 110A for the customer associated with customer branch office 118 and customer network 130. The matching prefix for this route may be based on information provided by that customer, and the destination for this route may be the secure tunnel interface represented by secure endpoint 115A. Device 104 decrypts the encrypted network traffic. Virtual domain 110 may then apply network function 105, in accordance with virtual domain 110A-specific preferences for network 105, to the network traffic, and virtual domain 110A may forward the network traffic to customer network 130. In some cases, the underlying network traffic is destined for another network, such as cloud service provider network 128. Virtual domain 110A may consequently forward the network traffic to the virtual domain 110 that is on a path to the destination network, via one of virtual domain connections 121.

In this way, device 104 creates a secure VPN that terminates within the customer's virtual domain 110A, the secure VPN having endpoints within the customer branch office 118. The customer branch office 118 may have a dedicated VPN gateway (not shown) to operate as the other secure endpoint for secure tunnel 119A. The secure VPN thus stretches between virtual domain 110A and the customer branch office 118 and, although encrypted network traffic for multiple customers may intermingle at external virtual domain 106, it is encrypted. The unencrypted network traffic for a customer is only present in device 104 within the virtual domain 110 configured for that customer. Device 104 may operate similarly with respect to virtual domain 110K and secure tunnel 119K for a VPN for the cloud service provider. In some cases, the VPN further protects the internal routing information by encrypting the IP headers of the customer network traffic. Customer network traffic is encapsulated by another set of IP headers for the secure tunnel 119 to which the customer network traffic is directed.

In some cases, the customer entry point into device 104 may be considered an A-side of a customer-provider interconnection while the exit-side connection may be considered a Z-side. The Z-side can also be configured as a hub where multiple spokes (A-side customers) connect to services. With a subscription, a customer receives Z-side services information. However, the Z-side receives connectivity information from all A-side subscribers to such services while maintaining privacy among A-side customers.

In effect, each customer manages a single "layer" of device 104, i.e., a corresponding one of virtual domains 110. The customer is only aware of that layer, its own network, and any networks to which the customer's layer has been stitched using one of virtual domain connections 121. The techniques may avoid L3VPNs that require additional labels or extra protocol tags to packets in order to separate customer traffic. Rather, the techniques facilitate isolation using virtual domains 110 and secure tunnels 119 and route-based VPNs. Once network traffic leaves device 104 to public network 120, it is encrypted network traffic with appropriate headers for reaching a destination. By contrast, L3VPN is labeled traffic and may not be encrypted. The external locations, such as customer branch office 118, terminate the corresponding secure tunnel 119. Network traffic sourced by customer branch office 118 is encrypted once it leaves domain towards external virtual domain 106 (public IP 111). IN some cases, the remote end, Z-side, or intermediate hops are unaware of there being traffic for multiple customers, i.e., they may consider it all single customer traffic coming from a single device 104. However, in reality, each flow belongs to a different customer, and customers control only their corresponding virtual domain 110 in order that the same platform (device 104) can be shared among multiple customers.

By integrating the VPN and the VPN gateway in a single device 104 using route-based VPNs applied at external virtual domain 106, which effectively functions as a VPN gateway within device 104 for networks connected to device 104, device 104 may enable multiple customer VPNs across respective virtual domains 110s, all sharing the same uplinks to public network 106. In addition, because secure tunnels 119 terminate in respective virtual domains 110, the data is encrypted until it reaches the corresponding virtual domain 110 for a customer. This may reduce security vulnerabilities and facilitate privacy. Even the provider that manages external virtual domain 106 does not have access to decrypted network traffic for customers in most cases. As a result, the techniques may allow device 104, its network function 105, license, and other services and resources to be shared across multiple customers of the provider in a secure manner, which facilitating connectivity and reachability with external branch offices and among customer networks connected to cloud exchange 102. This may reduce the time for on-boarding or delay for new customers, which may be added by simple configuration changes to device 104 and a one-time hookup to a port. This may also improve utilization of device 104 for a reseller or the provider.

Figure 2:
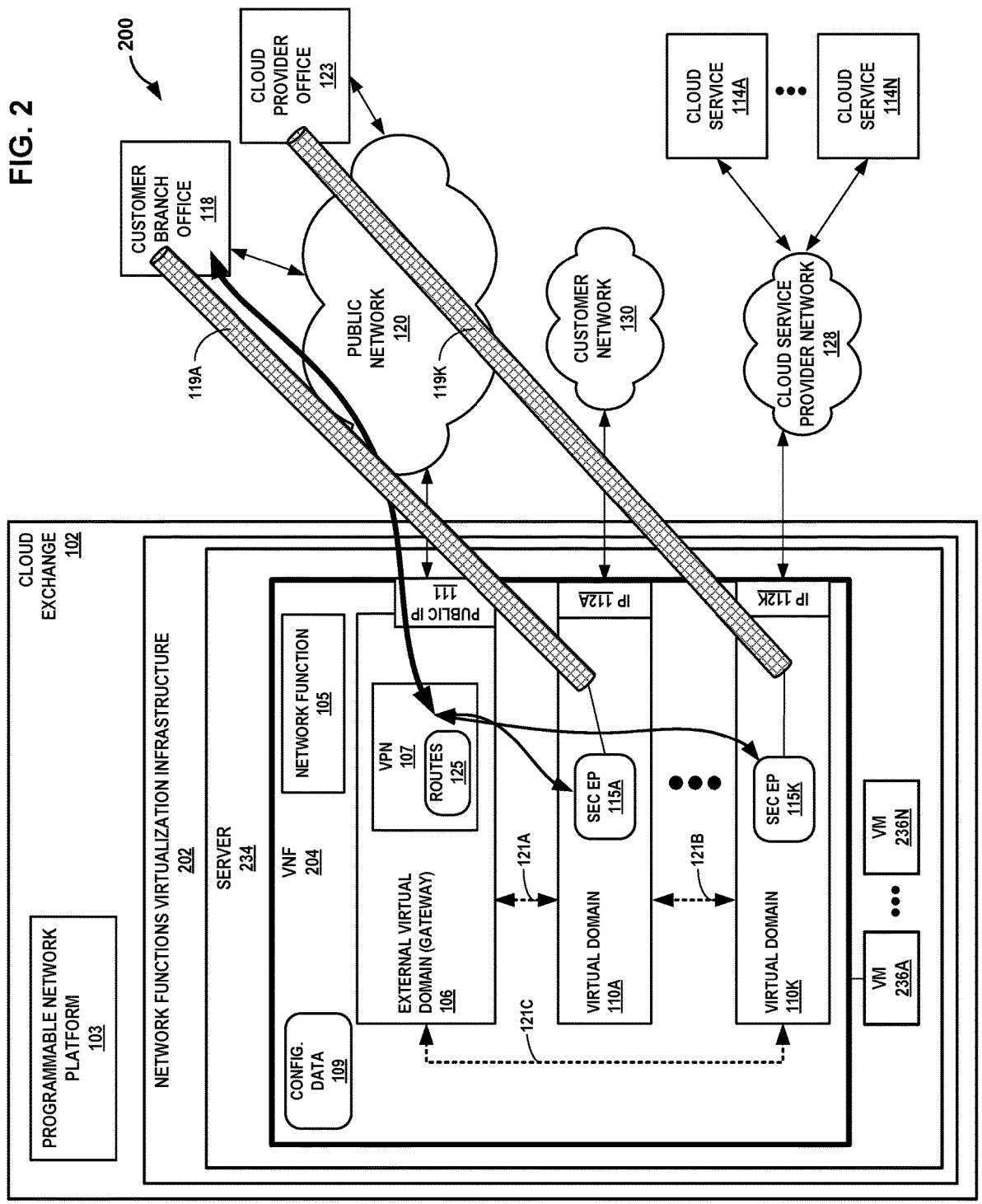
FIG. 2 is a block diagram that illustrates a system including an example device that executes a virtualized network function, configured and operating according to techniques described herein.

FIG. 2 is a block diagram that illustrates a system 200 including an example device 204 that executes a virtualized network function, configured and operating according to techniques described herein. In the example of system 200, a VNF 204 is configured similarly to device 104 of FIG. 1, which may be a PNF for the same network function, i.e., network function 105.

The cloud exchange 202 of FIG. 2 is similar to that of cloud exchange 102 and includes Network Functions Virtualization infrastructure (NFVI) 202, which may be provided in a data center environment that also includes the cloud exchange 102 switching fabric (not shown).

NFVI 202 may deploy one or more services, such as Virtualized Network Functions. NFVI 202 includes computing hardware, storage hardware, and network hardware for executing VNFs. In some examples, NFVI 202 further includes a virtualization layer over the hardware to offer virtual computing, virtual storage, and virtual network for executing VNFs. NFVI 202 may be executed by one or more computing devices in a centralized or distributed manner. In the example of FIG. 1, NFVI 202 platform includes servers, e.g., server 234, running virtualization software (e.g., hypervisors) that enable virtual execution environments on which VNF images (including the network infrastructure software) are deployed. Server 234 may provide one or more virtual machines 236A-236N (collectively, "VMs 136"). Each of VMs 236 emulates hardware. In other words, each of VMs 236 provides a virtualized operating system and application suite (e.g., to deploy VNFs) for customer access. Alternatively, or additionally, each of the servers may provide containers (e.g., such as those provided by the open source Docker Container application), or other virtual execution environments in which VNFs are implemented. VNF 204 is deployed as one of these virtual execution environments, here VM 236A.

VNF 204 may provide similar functionality to hardware-based network devices such as dedicated network appliances, but VNFs provide such functionality in software. A VNF is primarily a software construct and thus may be decoupled from the underlying hardware. For example, a VNF 204 can provide the same routing, switching firewall, intrusion detection or other services that have traditionally been provided by specialized hardware, but in software. VNF 204 can provide forwarding and network address translation services for network traffic to and from the VNF 204.

VNF 204 stores configuration data 109 that configures virtual domains 106, 110 similar to corresponding virtual domains in device 104 of FIG. 1. Accordingly, VNF 204 operates similarly to device 104 to implement route-based VPN to terminate secure tunnel 119 within virtual domains 110 such that VNF 204 can be shared among multiple customers (with corresponding virtual domains 110) with secure VPN traffic forwarding for customer traffic. Such operations and configurations of VNF 204 are described in detail with respect to device 104 of FIG. 1 operating in system 100. As with FIG. 1, a user may use programmable network platform 103 to configure VNF 204 with configuration data 109.

Other virtual domains may be present in addition to, or instead of, the virtual domains of the example system 200 illustrated in FIG. 1. For example, VNF 204 may include an Internet exchange virtual domain that couples the VNF 204 to an Internet exchange network, cloud exchange network, or a switching fabric.

In the example illustrated in FIG. 1, one server 134 and one VNF 204 have been shown. A typical NFVI infrastructure may include more than one server, and the servers may include more than one VNF.

Figure 3:
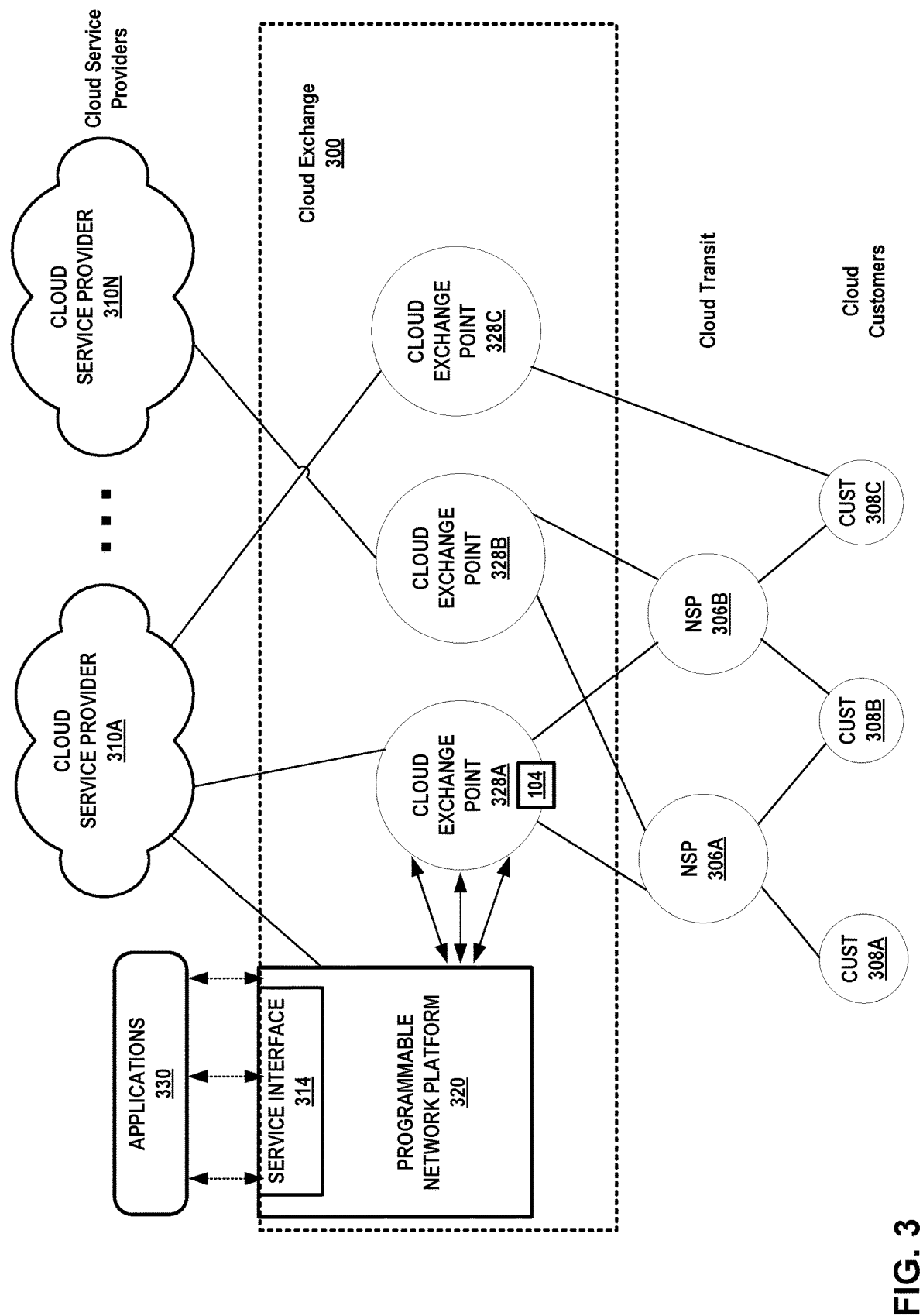
FIG. 3 illustrates a conceptual view of a network system having a metro-based cloud exchange that provides multiple cloud exchange points that include a device, according to techniques described herein.

FIG. 3 illustrates a conceptual view of a network system having a metro-based cloud exchange that provides multiple cloud exchange points that include a device, according to techniques described herein. The multiple cloud exchange points may be used to implement, at least in part, a NFVI 202 and/or connectivity with physical network functions for application to network traffic. For example, NFVI 202 may be connected to a cloud exchange fabric of cloud exchange 328A and include VNF 204. As illustrated, however, device 104 is connected to a cloud exchange fabric of cloud exchange 328A. These systems may be deployed within a single data center, in some cases.

Each of cloud-based services exchange points 328A-328C (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which cloud customers 308A-308C (collectively, "cloud customers 308") receive cloud services from multiple cloud service providers 310A-310N (collectively, "cloud service providers 310"). The cloud service provider 310 may host one of more cloud services 114. As noted above, the cloud service providers 310 may be public or private cloud service providers.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

Cloud customers 308 may receive cloud-based services directly via a layer 3 peering and physical connection to one of cloud exchange points 328 or indirectly via one of network service providers 306A-306B (collectively, "NSPs 306," or alternatively, "carriers 306"). Cloud customers 308 may include customers associated with a VNF 204 as described above. For example, cloud customers 308 may include systems used by any or all of customer devices used by cloud client 118 to access cloud services 114 via VNF 204. NSPs 306 provide "cloud transit" by maintaining a physical presence within one or more of cloud exchange points 328 and aggregating layer 3 access from one or customers 308. NSPs 306 may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C, in contrast, is illustrated as having contracted with the cloud exchange provider for cloud exchange 300 to directly access layer 3 cloud services via cloud exchange point 328C and also to have contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customer customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. Programmable network platform 320 may include a network service orchestrator 332 that handles tenant (e.g., cloud client) requests for deployment of VNFs. For example, network service orchestrator 332 may organize, direct and integrate underlying services through VMs 136 (or containers), as well as other software and network sub-systems, for managing various services (e.g., deployment of VNFs). The programmable network platform 320 may, as a result, orchestrate a business-level service across heterogeneous cloud service providers 310 according to well-defined service policies, quality of service policies, service level agreements, and costs, and further according to a service topology for the business-level service.

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable cloud customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a cloud customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange.

Cloud service provider network 310A may represent an example instance of cloud service provider network 128 of FIGS. 1-2, customer 308A may represent an example instance of customer network 130 of FIGS. 1-2. Programmable network platform 320 may provision one or more virtual circuits in cloud exchange point 328A to interconnect customer network 308A to cloud service provider network 310A and to forward the traffic via device 104 for processing with virtual domains 110 associated with the corresponding cloud service provider and customer, respectively. For example, a first virtual circuit may connect customer network 308A to virtual domain 110A of device 104, and a second virtual circuit may connect cloud service provider network 310A to virtual domain 110K. Device 104 includes a virtual domain connection 121B that stitches the first virtual circuit and second virtual circuit together to enable cloud service traffic to flow between the customer network 308A and the cloud service provider network 310A, via the virtual domains 110A and 110K that apply network function 105 in accordance with each customer's (the customer for virtual domain 110A and the customer/cloud service provider for virtual domain 110K in this example). policies for network function 105.

Figure 4:
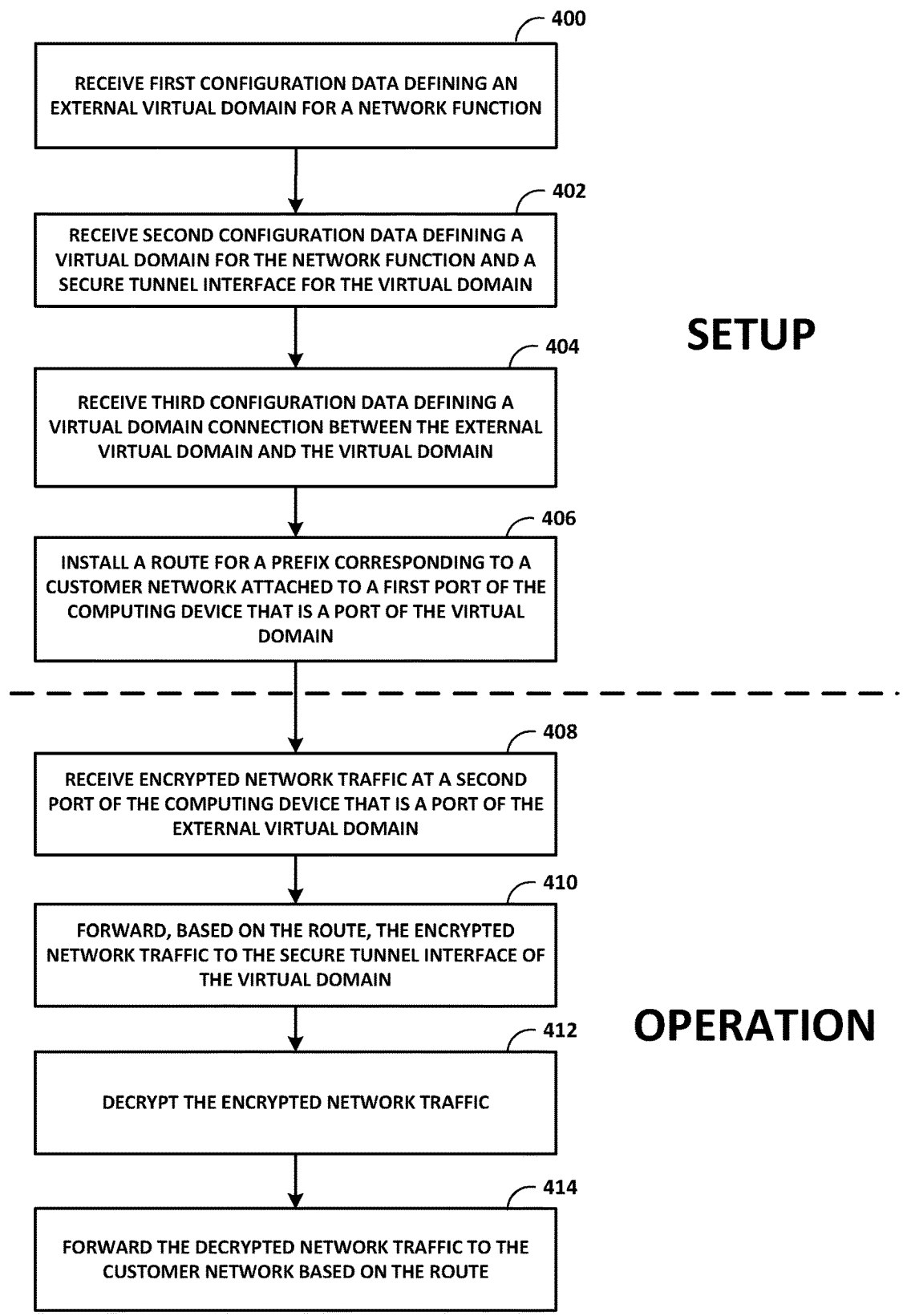
FIG. 4 is a flowchart illustrating an example mode of operation for a device, according to techniques of this disclosure.

FIG. 4 is a flowchart illustrating an example mode of operation for a device, according to techniques of this disclosure. This mode of operation includes a setup phase and an operation phase. Although shown for purposes of illustration with the operation phase following the setup phase, this order is not required, for in some instances setup may occur while the device is in an operating mode. During a setup phase, a computing device, such as device 104 or VNF 204 (executing on a server, for instance), receives first configuration data 109 defining an external virtual domain 106 for a network function 105 (400). The external virtual domain 106 may be managed and only configurable by a provider of the computing device, and not configurable by a customer of the provider. The computing device may operate as a gateway for virtual domains 110 to public network 120. The computing device receives second configuration data defining a virtual domain 110A for the network function 105 and a secure tunnel interface for the virtual domain 110A (402). The computing device receives third configuration data defining a virtual domain connection 121A between the external virtual domain 106 and the virtual domain 110A (404). The computing device obtains and installs, to a route-based virtual private network 107, a route for a prefix corresponding to a customer network 130 attached to a first port of the computing device that is a port of the virtual domain 110A, the route mapped to the secure tunnel interface of the virtual domain 110A (406). The secure tunnel interface may be a secure tunnel endpoint.

The computing device subsequently receives encrypted network traffic at a second port of the computing device that is a port of the external virtual domain 106. This port may be connected to (or is otherwise the port by which the computing device reaches) a public network 120 (408). The external virtual domain 106 does not decrypt the encrypted network traffic. The computing device forwards, based on the route 109, using the route-based virtual private network 107, the encrypted network traffic to the secure tunnel interface of the virtual domain 110A to which the prefix for route 109 is mapped (410).

The virtual domain 110A decrypts the encrypted network traffic (412) and forwards the decrypted network traffic to the customer network 130 based on the route 109 (414). In this way, virtual domains 110 for respective customers with secure VPN tunnels terminating within the customer-specific virtual domains 110 may improve security of customer traffic because unencrypted traffic for multiple customers that traverses public network 120 does not traverse common links or a common virtual domains, such as external virtual domain 106.

Figure 5:
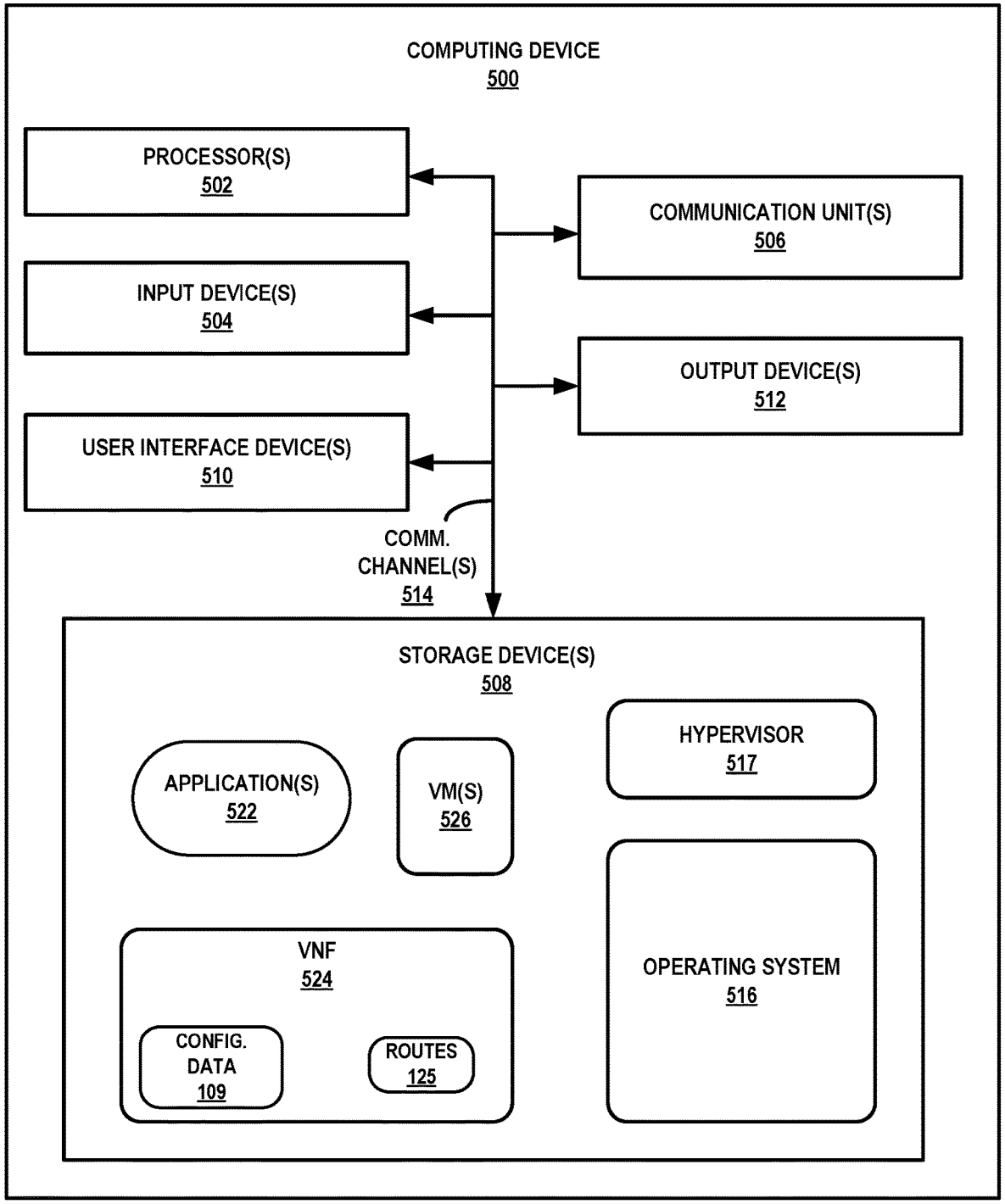
FIG. 5 is a block diagram illustrating further details of one example of a computing device that operates in accordance with one or more techniques of the present disclosure.

FIG. 5 is a block diagram illustrating further details of one example of a computing device that operates in accordance with one or more techniques of the present disclosure. FIG. 5 may illustrate a particular example of a server or other computing device 500 that includes one or more processor(s) 502 for executing any one or more of any system, application, or module described herein. Although the techniques of this disclosure are described in FIG. 5 with respect to a server executing a VNF, a physical appliance such as a dedicated router or firewall appliance may include similar components that operate similarly as described with respect to those of computing device 500. However, rather than executing a VNF 524, such a physical appliance would typically natively execute the network function and implement virtual domains, as described elsewhere herein.

One or more processor(s) 502 may execute VMs 526 and VNF 524. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be co-located or in the same chassis as other components).

As shown in the specific example of FIG. 5, computing device 500 includes one or more processors 502, one or more input devices 504, one or more communication units 506, one or more output devices 512, one or more storage devices 508, and user interface (UI) device 510, and communication units 506. Computing device 500, in one example, further includes one or more applications 522, hypervisor 517, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. In some examples, computing device 500 uses communication unit 506 to communicate with an external device. Communication units 506 may include or be connected to one or more ports of computing device 500. Ports may be associated to different virtual domains in the configuration data 109 for VNF 524 or for computing device 500 as a whole.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522, hypervisor 517, VMs 526 and VNF 524 with processors 502, communication unit 506, storage device 508, input device 504, user interface devices 510, and output device 512. Application 522, hypervisor 517, VMs 526 and VNF 524 may also include program instructions and/or data that are executable by computing device 500. Hypervisor 517 that enables process-based or system-based VMs 526 to execute as isolated device instances for executing VNF 524. In some cases, however, computing device 500 may execute VNF 524 as one or more deployed containers using container virtualization.

VNF 524 may represent an example instance of VNF 204 and stores configuration data 109 and routes 125 that define, at least in part, the configuration and operation of VNF 204 to establish and implement virtual domains, in accordance with techniques described in this disclosure and as described in detail above with respect to VNF 204 and device 104. The virtual domains may be associated with different customers of a provider or reseller for VNF 524.

Figure 6:
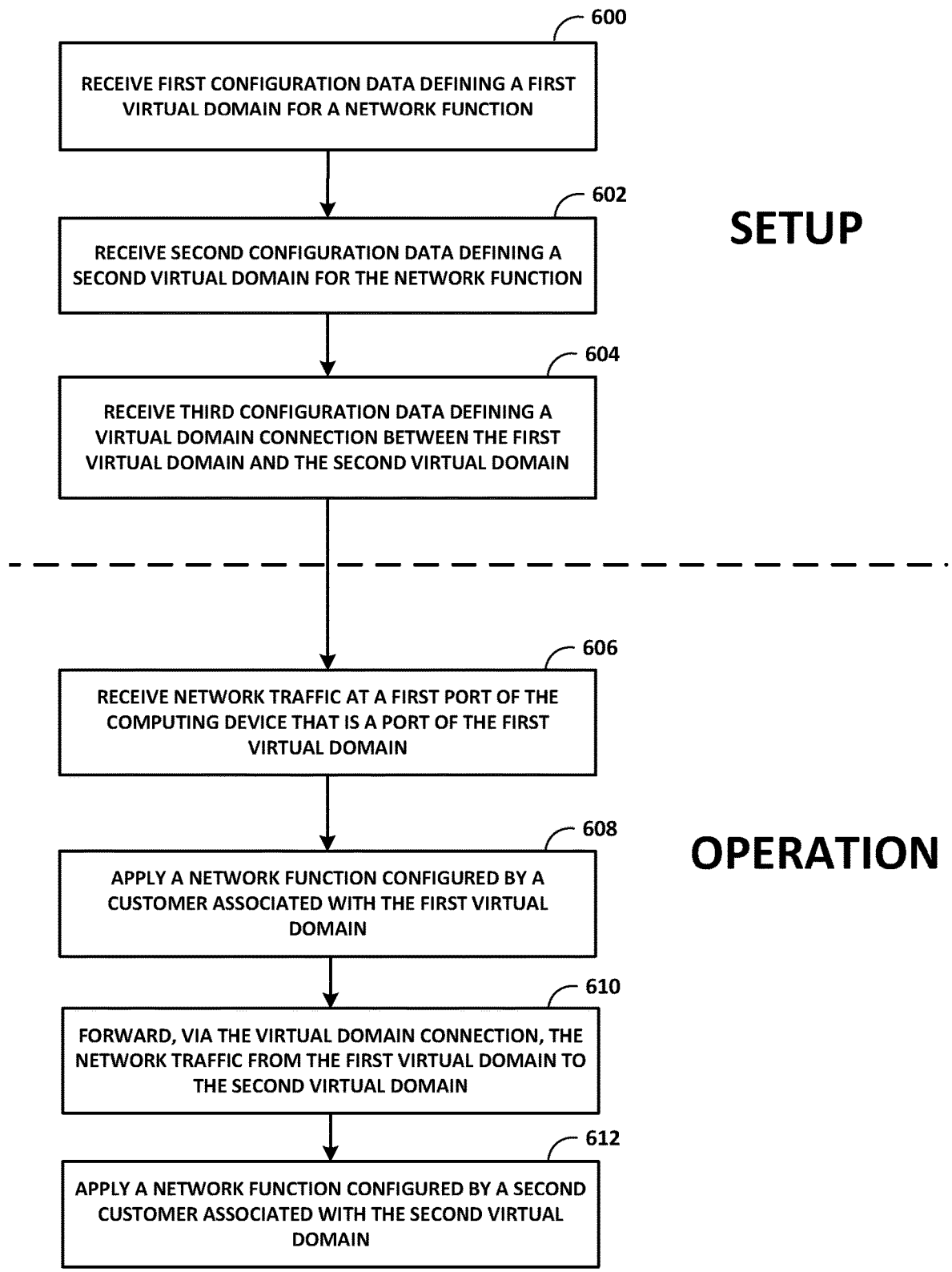
FIG. 6 is a flowchart illustrating an example mode of operation for a device, in accordance with techniques described in this disclosure.

FIG. 6 is a flowchart illustrating an example mode of operation for a device, in accordance with techniques described in this disclosure. This mode of operation includes a setup phase and an operation phase. Although shown for purposes of illustration with the operation phase following the setup phase, this order is not required, for in some instances setup may occur while the device is in an operating mode.

During a setup phase, a computing device, such as device 104 or VNF 204 (executing on a server, for instance), receives first configuration data 109 defining virtual domain 110A for network function 105 (600). The network function to be applied by virtual domain 110A may be managed and only configurable by a first customer of a provider of the computing device, and not configurable by the provider. First configuration data 109 may associate a first port of the computing device with virtual domain 110A. The computing device receives second configuration data 109 defining a virtual domain 110K for the network function 105 (602). The virtual domains 110A, 110K are separate from one another. Second configuration data 109 may associate a second port of the computing device with virtual domain 110K.

The computing device receives third configuration data 109 defining a virtual domain connection 121C between the virtual domain 110A and virtual domain 110K (604). Virtual domain connection 121C enables network traffic forwarding from virtual domain 110A to virtual domain 110K and, typically, vice-versa.

The computing device subsequently receives network traffic at the first port of the computing device that is a port of virtual domain 110A. This port may be connected to (or is otherwise the port by which the computing device reaches) a first customer network (e.g., customer network 130) (606). Virtual domain 110A applies network function 105 to the network traffic based on policies or other configuration set by the first customer for virtual domain 110A (608).

Virtual domain 110A forwards the network traffic via virtual domain connection 112C to virtual domain 110B (610). Virtual domain 110B applies network function 105 to the network traffic based on policies or other configuration set by the second customer for virtual domain 110B (612). Virtual domain 110B may subsequently forward the network traffic via the second port to a second customer network (e.g., cloud service provider network 128).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
   processing circuitry coupled to a memory, the processing circuitry and memory configured to implement:
   a network function;
   an external virtual domain for the network function, the external virtual domain connected to a public network and managed by a provider for the computing device; and
   a virtual domain for the network function, the virtual domain separate from the external virtual domain, configured with a secure tunnel interface, connected to a customer network, and managed by a customer of the provider for the computing device,
   wherein the external virtual domain implements a route-based virtual private network to forward encrypted network traffic, received from the public network via a secure tunnel, to the secure tunnel interface configured in the virtual domain, and
   wherein the virtual domain is configured to decrypt the encrypted network traffic to generate network traffic and forward the network traffic to the customer network.

2. The computing device of claim 1,
   wherein the virtual domain comprises a first virtual domain and the customer network comprises a first customer network,
   wherein the processing circuitry and memory are further configured to implement:
   a second virtual domain for the network function, the second virtual domain separate from the first virtual domain and the external virtual domain, and connected to a second customer network,
   wherein the first virtual domain and the second virtual domain are configured with a virtual domain connection, and routing information or firewall rules, to cause the first virtual domain to forward selected network traffic, received from the first customer network, to the second virtual domain for forwarding to the second customer network.

3. The computing device of claim 2, wherein the second customer network is a cloud service provider network.

4. The computing device of claim 2,
   wherein the secure tunnel interface is a first secure tunnel interface,
   wherein the second virtual domain is configured with a second secure tunnel interface,
   wherein the external virtual domain implements the route-based virtual private network to forward other encrypted network traffic, received from the public network via a different secure tunnel, to the second secure tunnel interface in the second virtual domain, and wherein the second virtual domain is configured to decrypt the other encrypted network traffic to generate other network traffic and forward the other network traffic to the second customer network.

5. The computing device of claim 1,
wherein the computing device is configured to limit, to the provider, authorization to configure the external virtual domain, and
wherein the computing device is configured to allow the customer to configure the virtual domain.

6. The computing device of claim 1, wherein the network function is a virtualized network function.

7. The computing device of claim 1,
wherein the route-based virtual private network comprises a route that maps a prefix to the secure tunnel interface and applies the route to forward the encrypted network traffic to the secure tunnel interface configured in the virtual domain.

8. The computing device of claim 1, wherein the external virtual domain implements a virtual private network gateway.

9. The computing device of claim 1, wherein the virtual domain is configured to apply the network function to the network traffic prior to forwarding the network traffic to the customer network.

10. The computing device of claim 1,
wherein the virtual domain comprises one of a virtual routing and forwarding instance or a firewall domain that stores routing information received from the customer network, and
wherein the virtual domain is configured to apply the routing information to the network traffic to forward the network traffic to the customer network.

11. The computing device of claim 1,
wherein the customer network is connected to the virtual domain via a cloud exchange fabric, and
wherein the public network is connected to the external virtual domain via the cloud exchange fabric.

12. A method comprising:
receiving, by a computing device, configuration data defining:
an external virtual domain for a network function, the external virtual domain connected to a public network and managed by a provider for the computing device;
a virtual domain for the network function, the virtual domain separate from the external virtual domain, configured with a secure tunnel interface, connected to a customer network, and managed by a customer of the provider for the computing device;
forwarding, by the external virtual domain implementing a route-based virtual private network, encrypted network traffic, received from the public network via a secure tunnel, to the secure tunnel interface configured in the virtual domain;
decrypting, by the virtual domain, the encrypted network traffic to generate network traffic; and
forwarding, by the virtual domain, the network traffic to the customer network.

13. The method of claim 12, wherein the route-based virtual private network comprises a route that maps a prefix to the secure tunnel interface and applies the route to forward the encrypted network traffic to the secure tunnel interface configured in the virtual domain.

14. A computing device comprising:
processing circuitry coupled to a memory, the processing circuitry and memory configured to implement:
a network function;
a first virtual domain for the network function, the first virtual domain connected to a first customer network and managed by a first customer of a provider for the computing device;
a second virtual domain for the network function, the second virtual domain separate from the first virtual domain, connected to a second customer network, and managed by a second customer of the provider for the computing device; and
a virtual domain connection enabling network traffic forwarding from the first virtual domain to the second virtual domain, the virtual domain connection configured by the provider for the computing device,
wherein the first virtual domain is configured to apply the network function to received network traffic prior to forwarding the received network traffic to the second virtual domain.

15. The computing device of claim 14,
wherein the virtual domain connection comprises a first virtual domain connection, and
wherein the processing circuitry and memory are further configured to implement:
an external virtual domain for the network function, the external virtual domain connected to a public network, managed by the provider for the computing device, and separate from the first virtual domain and the second virtual domain; and
a second virtual domain connection enabling network traffic forwarding from the external virtual domain to the second virtual domain, the second virtual domain connection configured by the provider for the computing device.

16. The computing device of claim 14, wherein the second virtual domain is configured to apply the network function to second received network traffic prior to forwarding the second received network traffic to the second customer network.

17. The computing device of claim 14, wherein the network function is a virtualized network function.

18. A computing device comprising:
processing circuitry coupled to a memory, the processing circuitry and memory configured to implement:
a network function;
a first virtual domain for the network function, the first virtual domain connected to a first customer network and managed by a first customer of a provider for the computing device;
a second virtual domain for the network function, the second virtual domain separate from the first virtual domain, connected to a second customer network, and managed by a second customer of the provider for the computing device; and
a virtual domain connection enabling network traffic forwarding from the first virtual domain to the second virtual domain, the virtual domain connection configured by the provider for the computing device,
wherein the computing device is configured to limit, to the provider, authorization to configure the virtual domain connection, and
wherein the computing device is configured to allow the first customer to configure the first virtual domain.

19. The computing device of claim 15, wherein the external virtual domain implements a virtual private network gateway.

\* \* \* \* \*